United States Patent
Kahn et al.

(10) Patent No.: US 9,516,554 B2
(45) Date of Patent: Dec. 6, 2016

(54) METHOD OF COORDINATING A PATH SWITCH AND NETWORK ELEMENTS ASSOCIATED THEREWITH

(71) Applicant: Alcatel Lucent USA, Inc., Murray Hill, NJ (US)

(72) Inventors: Colin Kahn, Morris Plains, NJ (US); Harish Viswanathan, Morristown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 125 days.

(21) Appl. No.: 14/338,841

(22) Filed: Jul. 23, 2014

(65) Prior Publication Data
US 2016/0029251 A1    Jan. 28, 2016

(51) Int. Cl.
| H04W 36/00 | (2009.01) |
| H04W 36/08 | (2009.01) |
| H04W 76/04 | (2009.01) |

(52) U.S. Cl.
CPC ......... *H04W 36/0005* (2013.01); *H04W 36/08* (2013.01); *H04W 76/041* (2013.01)

(58) Field of Classification Search
None
See application file for complete search history.

(56) References Cited

U.S. PATENT DOCUMENTS

| 2010/0281180 A1* | 11/2010 | Iyer ....................... H04L 67/104 709/234 |
| 2010/0306304 A1* | 12/2010 | Cao ................... H04W 36/0011 709/203 |
| 2011/0075633 A1* | 3/2011 | Johansson ............. H04W 36/02 370/331 |
| 2013/0058308 A1 | 3/2013 | Jaiswal et al. |
| 2014/0241247 A1* | 8/2014 | Kempf ................ H04L 12/4633 370/328 |
| 2015/0281128 A1* | 10/2015 | Sindhu .................... H04L 49/10 370/355 |

FOREIGN PATENT DOCUMENTS

GB    2488167 A    8/2012

OTHER PUBLICATIONS

Architecture/Protocol for Wireless & Mobility Working Group, Section 5 Architecture, Open Networking Foundation, pp. 1-3, Jul. 21, 2014.
International Search Report PCT/ISA/210 for International Application No. PCT/US2015/041459 Dated Oct. 13, 2015.

(Continued)

*Primary Examiner* — Diane Lo
(74) *Attorney, Agent, or Firm* — Harness, Dickey & Pierce, P.L.C.

(57) ABSTRACT

In one embodiment, the method includes instructing, by a controller, a switch to change from sending data via a first tunnel to sending data via a second tunnel. The first tunnel is between the switch and a first network element, and the second tunnel is between the switch and a second network element. The method further includes receiving, by the controller, acknowledgement from the switch, and notifying, by the controller, the second network element that packets will no longer be sent via the first tunnel in response to the received acknowledgement.

22 Claims, 4 Drawing Sheets

(56) References Cited

OTHER PUBLICATIONS

Written Opinion of the International Searching Authority PCT/ISA/237 for International Application No. PCT/US2015/041459 dated Oct. 2, 2015.
Aditya Gudipati et al. SoftRAN: Software Defined Radio Access Network, Bell Labs, 2013, 25-30.
Sophia Antipolis, Technical Specification Group Radio Access Network, 3GPP Organizational Partners, 2013, 1-195.

* cited by examiner

METHOD OF COORDINATING A PATH SWITCH AND NETWORK ELEMENTS ASSOCIATED THEREWITH

BACKGROUND

FIG. 1 illustrates an example of a portion of a prior art 3GPP wireless network. In 3GPP wireless networks, path switch coordination is accomplished via the sending of an "end-marker" that indicates no further packets will be sent on a path. An end-marker is sent in order to assist the packet reordering function in the target base station (e.g., enhanced NodeB also referred to as eNodeB or eNB). The serving gateway (SGW) for inter-eNB handoffs sends the end-marker whenever the serving eNB changes for a radio access bearer (RAB). In the 3GPP implementation, the "end-marker" is a message signaled in the GPRS tunneling protocol (GTP) header and the packet does not contain user data. When the SGW changes, the packet gateway (PGW), which communicates user data from a content source, sends an end-marker message to the SGW via the GTP-U S5/S8 interface. Upon reception of an end-marker message, the eNB or SGW may release the bearer plane resources for that leg.

SUMMARY

While this solution is fine for 4G path switching, it is not compatible with evolving software defined networking (SDN) architectures that are proposed for 5G. In those architectures signaling functions such as the "end-marker" belong in the control plane, supported by a centralized SDN controller. Namely, the switches (corresponding in part to the SGW) cannot send end-markers in 5G architectures.

At least one example embodiment relates to methods and/or apparatuses for providing end-marker functionality in a software defined networking architecture. While example embodiments are applicable to the evolving 5G wireless standard, example embodiments may also be applied in non-wireless scenarios where packets are forwarded via multiple paths and a reordering function needs to know when the last packet has been received on a given path.

In one embodiment, the method includes instructing, by a controller, a switch to change from sending data via a first tunnel to sending data via a second tunnel. The first tunnel is between the switch and a first network element, and the second tunnel is between the switch and a second network element. The method further includes receiving, by the controller, acknowledgement from the switch, and notifying, by the controller, the second network element that packets will no longer be sent via the first tunnel in response to the received acknowledgement.

In one embodiment, the notifying includes sending a message to the second network element, the message indicating that no further packets will be sent via the first tunnel.

In one embodiment, the method further includes delaying the sending.

In one embodiment, the receiving receives a sequence number from the switch, and the sequence number being for a last packet that the switch sent via the first tunnel.

In one embodiment, the notifying includes sending the sequence number.

In one embodiment, the sequence number is part of the acknowledgement.

In one embodiment, the method further includes notifying, by the controller, the first network element that packets will no longer be sent via the first tunnel in response to the received acknowledgement.

In one embodiment, the instructing instructs the switch to change from sending data via the first tunnel to sending data via the second tunnel in response to a serving base station for a mobile station changing from the first network element to the second network element In one embodiment of a controller, the controller includes a memory storing a program routine, at least one processor configured by executing the program routine to, instruct a switch to change from sending data via a first tunnel to sending data via a second tunnel, the first tunnel being between the switch and a first network element, and the second tunnel being between the switch and a second network element; receive acknowledgement from the switch; and notify the second network element that packets will no longer be sent via the first tunnel in response to the received acknowledgement.

In one embodiment, the controller is configured to perform the notifying by sending a message to the second network element, the message indicating that no further packets will be sent via the first tunnel.

In one embodiment, the controller is configured to delay sending the message.

In one embodiment, the controller is configured to receive a sequence number from the switch, the sequence number being for a last packet that the switch sent via the first tunnel.

In one embodiment, the controller is configured to perform the notifying by sending the sequence number.

In one embodiment, the sequence number is part of the acknowledgement.

In one embodiment, the controller is configured to notify the first network element that packets will no longer be sent via the first tunnel in response to the received acknowledgement.

In one embodiment, the controller is configured to instruct the switch to change from sending data via the first tunnel to sending data via the second tunnel in response to a serving base station for a mobile station changing from the first network element to the second network element.

Another embodiment of the method includes receiving, by a switch, an instruction to change from sending data via a first tunnel to sending data via a second tunnel, the first tunnel being between the switch and a first network element, and the second tunnel being between the switch and a second network element; tearing down the first tunnel by the switch; and sending, by the switch, an acknowledgement signifying that no further data packets will be sent via the first tunnel after the first tunnel is torn down. The first and second network elements may be first and second base stations, respectively.

In one embodiment, the sending includes sending a sequence number of a last data packet sent via the first tunnel.

In another embodiment, the method includes receiving first packets from a first network element at a second network element; receiving, at the second network element, second packets from a switch; receiving, at the second network element, a notification from a controller that no more packets will be received from the first network element; and de-allocating, at the second base station, resources for receiving the first packets in response to the notification. The first and second network elements may be first and second base stations, respectively.

In one embodiment, this method further includes managing, at the second network element, the first and second packets by eliminating duplicate packets and ordering the first and second packets

BRIEF SUMMARY OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1:
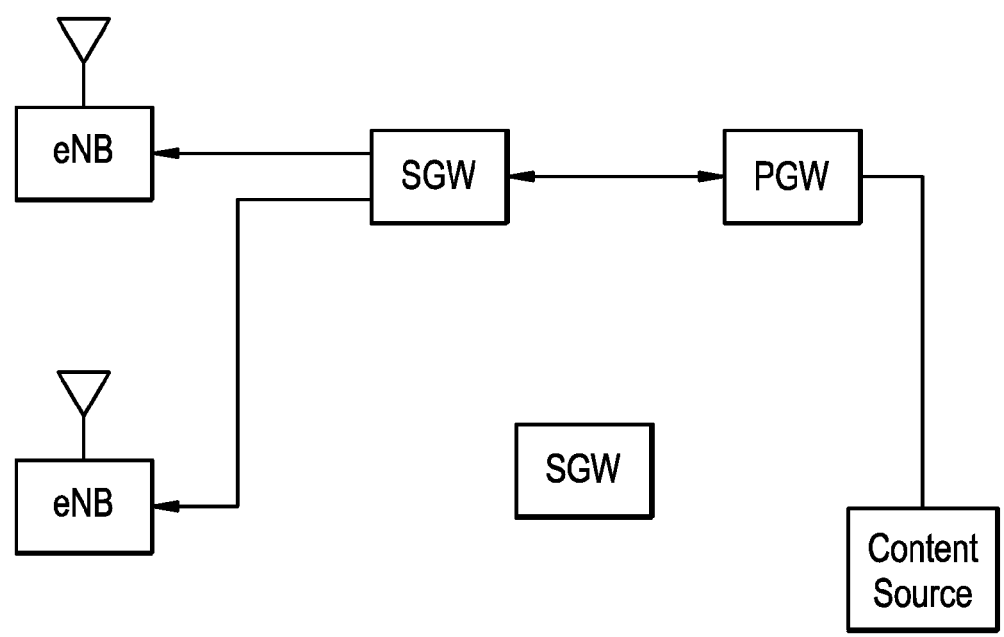
FIG. 1 illustrates an example of a portion of a prior art 3GPP wireless network.

Various example embodiments will now be described more fully with reference to the accompanying drawings in which some example embodiments of the invention are shown.

Detailed illustrative embodiments are disclosed herein. However, specific structural and functional details disclosed herein are merely representative for purposes of describing example embodiments of the present invention. This invention however, may be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, and/or other machine readable mediums for storing information. The term "storage medium" may represent one or more devices for storing data, including read only memory (ROM), random access memory (RAM), magnetic RAM, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used herein, the term "mobile station" may be considered synonymous to, and may hereafter be occasionally referred to, as a client, mobile, mobile unit, user agent, mobile user, user equipment (UE), subscriber, user, remote station, access agent, user agent, receiver, etc., and may describe a remote user of network resources in a communications network. Furthermore, the term "user agent" may include any type of wireless/wired device such as consumer electronics devices, smart phones, tablet personal computers, personal digital assistants (PDAs), desktop computers, and laptop computers, for example.

The term "base station" may be understood as a one or more cell sites, base stations, base transceiver stations, access points, and/or any terminus of radio frequency communication. Although current system architectures may consider a distinction between mobile/user devices and access points/cell sites, the example embodiments described hereafter may generally be applicable to architectures where that distinction is not so clear, such as ad hoc and/or mesh system architectures, for example.

Example embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular data types. The program modules and functional processes discussed herein may be implemented using existing hardware in existing communication networks. For example, program modules and functional processes discussed herein may be implemented using existing hardware at existing network elements or control nodes. Such existing hardware may include one or more digital signal processors (DSPs), application-specific-integrated-circuits, field programmable gate arrays (FPGAs) computers or the like.

Figure 2:
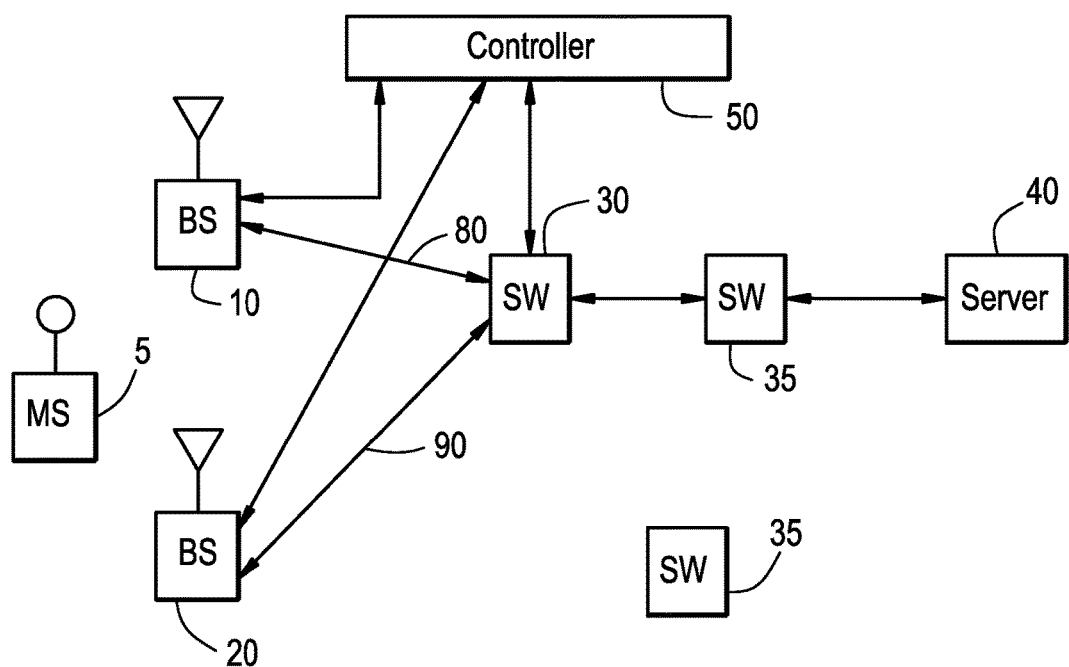
FIG. 2 illustrates an example of a portion of a software defined networking wireless network architecture.

FIG. 2 illustrates an example of a portion of a software defined (SDN) networking wireless network architecture. As shown, a SDN controller 50 programs an SDN switch 30 to forward packets destined for a mobile station 5 to a current serving base station, first base station 10. The first base station 10 wirelessly communicates the data in the data packets to the mobile station 5.

The SDN switch 30 forwards the packets over a first general routing encapsulation (GRE) tunnel 80. The SDN switch 30 may receive the packets from one or more content servers 40 via one or more intermediary switches 35.

As will be appreciated, the SDN controller 50 may perform various functions such as those associated with network configuration, network topology, resource utilization, etc. In particular the SDN controller 50 and associated applications may perform the functions of a mobility management entity (MME). Here, the SDN controller 50 manages session states, authentication, paging, mobility, roaming, bearer management functions, etc.

The various MME functionalities are well-known and will not be discussed in detail. These functionalities are referenced here to provide a proper understanding that the SDN controller 50 manages mobility of the mobile station 5 within the network. For instance, the SDN controller 50 may instruct the switch 30 via the control plane to change from sending data (e.g., packets) via the data plane for the mobile station 5 via the first GRE tunnel 80 to sending the packets via a second GRE tunnel 90, the second GRE tunnel 90 being between the switch 30 and a second base station 20. For example, such a second GRE tunnel 90 may be established for transitioning the serving base station from the first base station 10 to the second base station 20. This action may take place, for example, if the mobile station 5 may be handed over to the second base station 20.

The SDN controller 50 will also instruct via the control plane the first base station 10 and the second base station 20 that the first base station 10 is to forward packets received for the mobile station 5 to the second base station 20. The first base station 10 establishes resources for forwarding the packets to the second base station 20, and the second base station 20 establishes resources for receiving the forwarded packets. The second base station 20 also manages the packets for the mobile station 5, which were received from the switch 30 and the first base station 10, by eliminating duplicate packets and ordering the received packets.

In response to the instruction, and after establishing the second GRE tunnel 90 if the second GRE tunnel 90 has not already been established, the switch 30 will tear down the first GRE tunnel 80. Then, the switch 30 sends an acknowledgement via the control plane to the SDN controller 50 signifying that no further data packets will be sent via the first GRE tunnel 80.

When the acknowledgment is received from the switch 30, the SDN controller 50 sends a notification via the control plane to the first base station 10 and the second base station 20 that packets will no longer be sent via the first GRE tunnel 80. In response, the first base station 10 de-allocates forwarding resources for forwarding packet for the mobile station 5 to the second base station 20, and the second base station 20 de-allocates resources for receiving the packets from the first base station 10.

The acknowledgement from the switch 30 and the notification message from the SDN controller 50 may optionally include a sequence number corresponding to the last packet sent by the switch 30 on the first GRE tunnel 80. The SDN controller 50 may include this sequence number in the notification message to the second base station 20, and optionally, to the first base station 10. The second base station 20 may stop packet reordering and de-allocate resources associated with the first GRE tunnel 80 after a packet with that sequence number has been received. When a sequence number of the last packet will not be sent in the notification message, the SDN controller 50 may delay sending the notification message for a period of time after receipt of the acknowledgement from the switch 30. This helps ensure that the last in-flight packets have been received at the second base station 20 on the forwarding tunnel from the first base station 10.

The switches 30 and 35 may be any well-known software defined switch. The switches 30 and 35 may include one or more processors, various interfaces, a computer readable medium, and (optionally) a display device. The one or more interfaces may be configured to transmit/receive (wireline or wirelessly) data signals via the data plane to/from one or more other switches, servers 40 and/or base stations 10 and 20; and to transmit/receive (wireline or wirelessly) controls signals via the control plane to/from the controller 50.

Server 40 may include one or more servers (i.e., a physical computer hardware system) that is configured to provide services for users connected to a network. Furthermore the server may constitute a corresponding node such as another mobile station 5. The one or more servers 40 may employ connection-oriented protocols such as Session Initiation Protocol (SIP), HTTP, and TCP/IP, and includes servers that use connectionless protocols such as User Datagram Protocol (UDP) and Internet Packet Exchange (IPX).

The base stations 10 and 20 may include one or more processors, various interfaces including one or more transmitters/receivers connected to one or more antennas, a computer readable medium, and (optionally) a display device. The one or more interfaces may be configured to transmit/receive (wireline and/or wirelessly) data or controls signals via respective data and control planes to/from one or more switches, SDN controllers, other base stations, and mobile stations.

The SDN controller may execute on one or more processors, various interfaces including one or more transmitters/receivers connected to one or more antennas, a computer readable medium, and (optionally) a display device. The one or more interfaces may be configured to transmit/receive (wireline and/or wirelessly) control signals via the control plane to/from one or more switches and the base stations.

Figure 3:
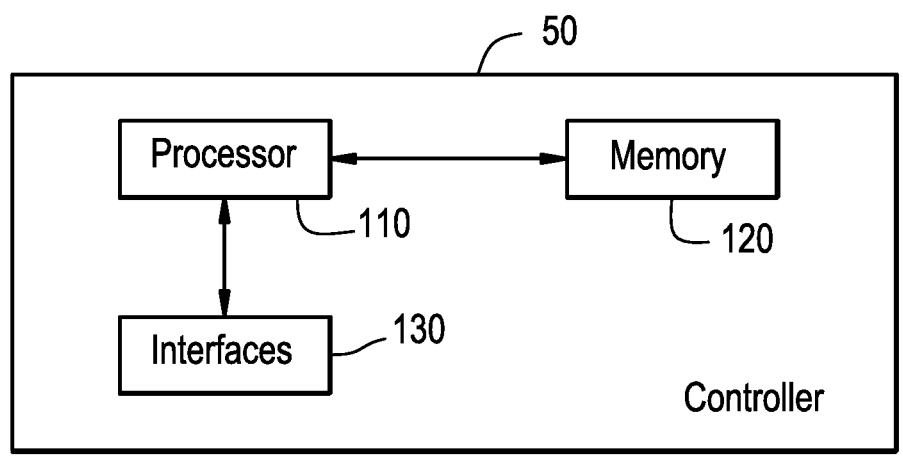
FIG. 3 illustrates the components of a network element according to an example embodiment.

Collectively, the base stations, the switches and the SDN controller may be referred to as network elements. FIG. 3 illustrates the components of a network element according to an example embodiment. For the purposes of description, the network element in FIG. 3 will be assumed to be the SDN controller 50.

As shown, the SDN controller 50 includes a processor 110, connected to a memory 120 and various interfaces 130. During operation, memory 120 includes an operating system and any other routines/applications for providing the functionalities of the SDN controller (e.g., MME applications). In some embodiments, SDN controller 50 may include many more components than those shown in FIG. 3. However, it is not necessary that all of these generally conventional components be shown in order to disclose the illustrative embodiment.

Memory 120 may be a computer readable storage medium that generally includes a random access memory (RAM), read only memory (ROM), and/or a permanent mass storage device, such as a disk drive. Memory 120 also stores operating system and any other routines/modules/applications for providing the functionalities of the SDN controller (e.g., MME applications). These software components may also be loaded from a separate computer readable storage medium into memory 120 using a drive mechanism (not shown). Such separate computer readable storage medium may include a disc, tape, DVD/CD-ROM drive, memory card, or other like computer readable storage medium (not shown). In some embodiments, software components may be loaded into memory 120 via one of the various interfaces 130, rather than via a computer readable storage medium.

Processor 110 may be configured to carry out instructions of a computer program by performing the basic arithmetical, logical, and input/output operations of the system. Instructions may be provided to processor 110 by memory 120.

The various interfaces 130 may include computer hardware components that connect SDN controller 50 via a wired or wireless connection to the switches 30 and 35, base stations 10 and 20, etc.

As will be understood, the interfaces 130 and programs stored in the memory 120 to set forth the special purpose functionalities of the network element will vary depending on the network element.

Next, the method of coordinating a path switch according to an example embodiment will be described with respect to the communication flow diagram illustrated in FIG. 4. For the purposes of description, the method will be described as implemented on the architecture of FIG. 2. Accordingly, it will be understood that the processors in the base stations, switches and controller are configured based on routines/modules/applications stored in associated memories to perform the special purpose functionalities associated with the method of coordinating a path switch.

Figure 4:
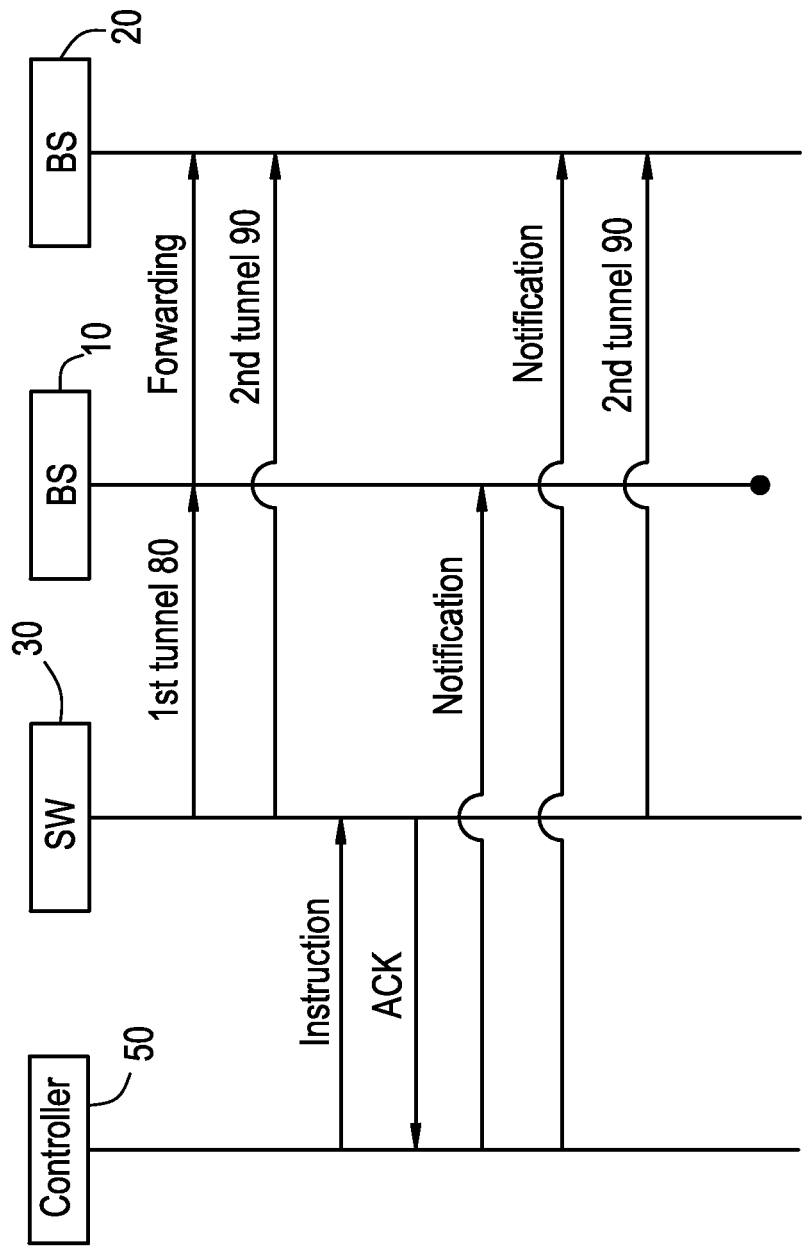
FIG. 4 illustrates a communication flow diagram for the method of coordinating a path switch according to an example embodiment.

As shown in FIG. 4, the SDN controller 50 sends an instruction to the switch 30 to change from sending data packets destined for the mobile station 5 via the first GRE tunnel 80 to sending data packets via the second GRE tunnel 90. In this example, it is assumed that the SDN controller 50 had previously instructed the switch 30 to establish the second GRE tunnel 90 as well as instructed the first base station 10 to forward data packets for the mobile station 5 to the second base station 20. However, it will be understood, that the switch 30 may instead establish the second GRE tunnel 90 in response to the instruction, and that the SDN controller 50 may concurrently establish packet forwarding from the first base station 10 to the second base station 30.

In response to the instruction, the switch 30 tears down the first GRE tunnel 80, and then sends an acknowledgement (ACK) to the SDN controller 30. In response to the acknowledgement, the controller 50 notifies the first and second base stations 10 and 20 that packets for the mobile station 5 will no longer be sent via the first GRE tunnel 80. These notifications may be sent concurrently, the notification for the first base station 10 may be sent first, or the notification for the second base station 20 may be sent first.

In response to the notification received at the first base station 10, the first base station 10 de-allocates forwarding resources for forwarding packet for the mobile station 5 to the second base station 20; and in response to the notification received at the second base station 20, the second base station 20 de-allocates resources for receiving the packets from the first base station 10. Alternatively, if the last sequence number is provided with the notification, then de-allocation occurs in response to receiving the packet with the last sequence number.

Accordingly, example embodiments provide methods and/or apparatuses for providing end-marker functionality in a software defined networking architecture. While example embodiments are applicable to the evolving 5G wireless standard, example embodiments may also be applied in non-wireless scenarios where packets are forwarded via multiple paths and a reordering function needs to know when the last packet has been received on a given path.

The invention being thus described, it will be obvious that the same may be varied in many ways. Such variations are not to be regarded as a departure from the invention, and all such modifications are intended to be included within the scope of the present invention.

We claim:

1. A method of coordinating a path switch, the method comprising:
    instructing, by a controller, a switch to change from sending data via a first tunnel to sending data via a second tunnel, the first tunnel between the switch and a first network element, and the second tunnel between the switch and a second network element;
    receiving, by the controller, acknowledgement from the switch; and
    notifying, by the controller, the second network element that packets will no longer be sent via the first tunnel in response to the received acknowledgement.

2. The method of claim 1, wherein the notifying includes sending a message to the second network element, the message indicating that no further packets will be sent via the first tunnel.

3. The method of claim 2, further comprising:
    delaying the sending.

4. The method of claim 1, wherein the receiving receives a sequence number from the switch, the sequence number being for a last packet that the switch sent via the first tunnel.

5. The method of claim 4, wherein the notifying includes sending the sequence number.

6. The method of claim 4, wherein the sequence number is included in the received acknowledgement.

7. The method of claim 1, further comprising:
notifying, by the controller, the first network element that packets will no longer be sent via the first tunnel in response to the received acknowledgement.

8. The method of claim 1, wherein the instructing instructs the switch to change from sending data via the first tunnel to sending data via the second tunnel in response to a serving base station for a mobile station changing from the first network element to the second network element.

9. A controller, comprising:
a memory having computer readable instructions stored thereon; and
at least one processor configured to execute the computer readable instructions to,
instruct a switch to change from sending data via a first tunnel to sending data via a second tunnel, the first tunnel between the switch and a first network element, and the second tunnel between the switch and a second network element;
receive acknowledgement from the switch; and
notify the second network element that packets will no longer be sent via the first tunnel in response to the received acknowledgement.

10. The controller of claim 9, wherein the at least one processor is further configured to execute the computer readable instructions to,
send a message to the second network element as the notification, the message indicating that no further packets will be sent via the first tunnel.

11. The controller of claim 10, wherein the at least one processor is further configured to execute the computer readable instructions to delay sending the message.

12. The controller of claim 9, wherein the at least one processor is further configured to execute the computer readable instructions to receive a sequence number from the switch, the sequence number being for a last packet that the switch sent via the first tunnel.

13. The controller of claim 12, wherein the at least one processor is further configured to execute the computer readable instructions to send the sequence number as the notification.

14. The controller of claim 12, wherein the sequence number is included in the received acknowledgement.

15. The controller of claim 9, wherein the at least one processor is further configured to execute the computer readable instructions to notify the first network element that packets will no longer be sent via the first tunnel in response to the received acknowledgement.

16. The controller of claim 9, wherein the at least one processor is further configured to execute the computer readable instructions to instruct the switch to change from sending data via the first tunnel to sending data via the second tunnel in response to a serving base station for a mobile station changing from the first network element to the second network element.

17. A method of switching a data path, the method comprising:
receiving, by a switch, an instruction to change from sending data via a first tunnel to sending data via a second tunnel, the first tunnel between the switch and a first network element, and the second tunnel between the switch and a second network element;
tearing down the first tunnel by the switch; and
sending, by the switch, an acknowledgement signifying that no further data packets will be sent via the first tunnel after the first tunnel is torn down.

18. The method of claim 17, wherein the sending includes sending a sequence number of a last data packet sent via the first tunnel.

19. The method of claim 18, wherein the first and second network elements are first and second base stations.

20. A method of operating a network element, the method comprising:
receiving first packets from a first network element at a second network element;
receiving, at the second network element, second packets from a switch;
receiving, at the second network element, a notification from a controller that no more packets will be received from the first network element; and
de-allocating, at a second base station, resources for receiving the first packets in response to the notification.

21. The method of claim 20, further comprising:
managing, at the second network element, the first and second packets by eliminating duplicate packets and ordering the first and second packets.

22. The method of claim 20, wherein the first and second network elements are first and second base stations.

* * * * *